May 26, 1964 R. G. NORELIUS 3,134,941
BOREHOLE DIAMETER AND LATERAL DEPTH OF FLUID INVASION INDICATOR
Original Filed Jan. 18, 1949 4 Sheets-Sheet 3

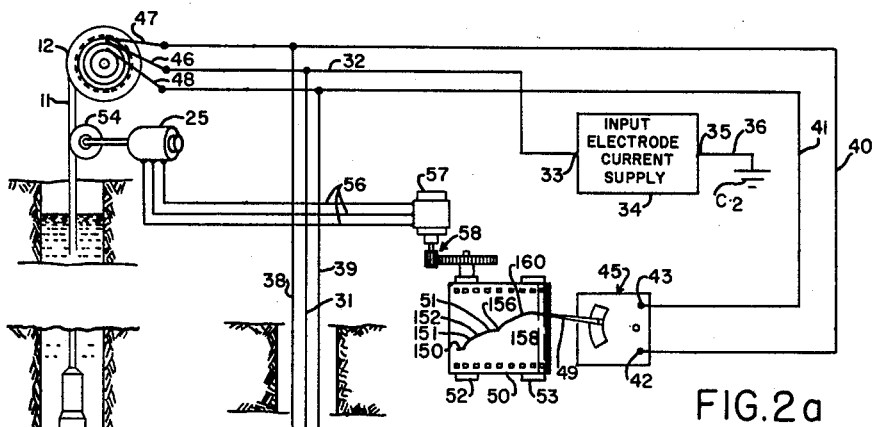

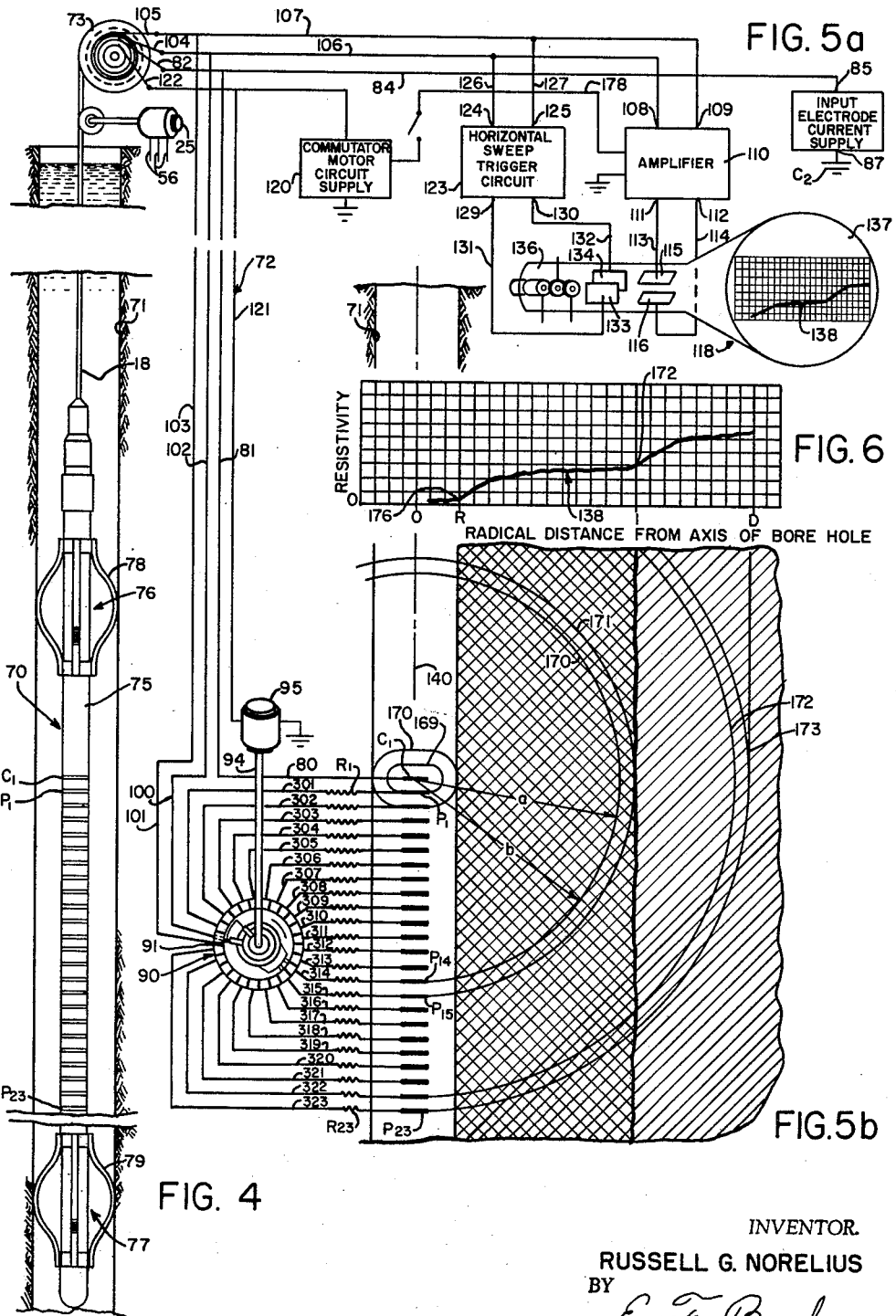

INVENTOR.
RUSSELL G. NORELIUS
BY
*E. F. Bard*
ATTORNEY

United States Patent Office 3,134,941
Patented May 26, 1964

3,134,941
BOREHOLE DIAMETER AND LATERAL DEPTH
OF FLUID INVASION INDICATOR
Russell G. Norelius, Houston, Tex., assignor to Dresser Industries, Inc., Dallas, Tex., a corporation of Delaware
Continuation of abandoned application Ser. No. 600,149, June 18, 1956, which is a division of application Ser. No. 73,375, Jan. 18, 1949, now Patent No. 2,754,475, dated July 10, 1956. This application May 19, 1961, Ser. No. 114,276
10 Claims. (Cl. 324—1)

This invention relates, in general, to electrical logging of well boreholes and more particularly to methods and apparatus for determining the borehole diameter and the depth of invasion of fluid into the penetrated formations.

This application is a continuation of copending application Serial No. 600,149, filed June 18, 1956, now abandoned, which, in turn, is a division of application Serial No. 73,375, filed January 18, 1949, now U.S. Patent 2,754,475, issued July 10, 1956.

This invention utilizes the principles of but constitutes an improvement over the conventional multiple electrode method of so-called deep penetration resistivity, electrical coring or electrical logging of well boreholes, an early disclosure of the basic principles of which may be found in the patent to Schlumberger 1,819,923. In this so-called deep penetration resistivity logging, as heretofore practiced, an electric current is conducted through a conductor in a multi-conductor cable to a current input electrode located within and in electrical contact with the fluid of the borehole. The return path for the current from the input electrode extends through the surrounding earth formations to another remotely located current input electrode suitably located either within the fluid in the well borehole or elsewhere in the ground at the earth surface, and the direction of flow of the current is substantially radially diverging in all directions for a substantial distance in all directions from the input electrode through the surrounding fluid in the borehole and out through the surrounding formations. As a result of the before-mentioned radially diverging current flow paths in all directions from the input electrode, an infinite number of concentric spherical equipotential surfaces may be considered as surrounding the input electrode as a center. Potential differences existing between any two of these so-called concentric spherical surfaces may be tested by means of a pair of potential pick-up electrodes spaced apart radially with respect to one another and with respect to said input electrode. Resistivity measurements are thus generally made by means of a separate pair of longitudinally spaced potential pick-up electrodes usually positioned on the longitudinal axis of the well borehole either above or below the beforementioned current input electrode, the distance of the axial spacing between the pick-up electrodes and the current input electrode being equal to the desired, so-called lateral depth of penetration of the resistivity measurement desired to be made.

Resistivity measurements thus made actually are measurements of the average resistivity of the bodies of formation and well borehole fluid contained within the spherical shell having a thickness equal to the spacing of the pick-up electrodes and surrounding the current input electrode as a center. Due to differences in the electrical characteristics of the well borehole fluid and various portions of the formation surrounding the well borehole, intersected by the spherical potential measurement shell, the said shell may actually be somewhat distorted in shape and consequently the resulting resistivity measurement may be only approximately indicative of the average resistivities of the various materials included within the beforementioned spherical shell. Thus, by this method it has been, heretofore, impossible to determine the resistivity of the surrounding formations with sufficient quantitative accuracy and, furthermore, it has been impossible to obtain accurate information as to the lateral depth of any discontinuities in the electrical characteristics of the surrounding formations.

This invention is an improvement over the hereinbefore described electrical logging system, which makes available an electrical log of the well borehole from which the electrical resistivities of the formations surrounding the well borehole and the lateral depth of electrical discontinuities therein may be more accurately determined and, furthermore, this invention provides a means for obtaining an electrical log of the well borehole diameter.

Accordingly, an object of this invention is to provide an electrical system for determining the diameter of the well borehole.

Another object of this invention is to provide an electrical method and apparatus for making a continuous log of borehole diameters correlated with depth.

Still another object of this inveniton is to provide an electrical method and apparatus for determining the lateral depth of penetration of well borehole fluid into the penetrated formations surrounding the borehole, and to make a continuous log thereof correlated with borehole depth.

Another object of this invention is to provide an electrical method and apparatus for providing an improved electrical log of a well borehole wherewith more and better information can be obtained relative to the physical and electrical characteristics of the penetrated formations surrounding the well borehole.

The objects of this invention are accomplished, in general, by establishing an electrical field converging substantially radially through surrounding formations upon an input electrode in the fluid within a well borehole, locating a pair of probes or pick-up electrodes in electrical contact with the fluid in the well borehole, said pick-up electrodes of said pair being spaced apart axially with respect to one another a given fixed distance and the said pair being spaced axially with respect to the beforementioned input electrode, and moving or reciprocating said pair of pick-up electrodes axially in said borehole with respect to said input electrode to effect a continuous change of axial spacing between said pair of electrodes and said input electrode and observing or recording the resultant simultaneously changing relationships between the potential picked up between said pair of electrodes and the said axial spacing between said pair of electrodes and said input electrode. Resistivity measurements are thus, in effect, made at continuously varying lateral depths in the fluid in the borehole and formation surrounding the borehole, whereby the positions of any lateral discontinuities in electrical resistivity become apparent.

These and other objects, features of novelty and advantages will be evident hereinafter.

In the drawings which illustrate preferred embodiments and modes of operation of the invention and in which like reference characters designate the same or similar parts throughout the several views:

FIGURE 1 is a vertical elevational view of the general assembly of the electrode assembly portion of the apparatus of the invention as it would appear when suspended in a well borehole in readiness for operation.

FIGURES 2a and 2b are portions of a schematic diagram of the apparatus of the invention included in that shown in FIGURE 1.

FIGURE 3 is an enlarged view of the graphical record produced by the indicating or recording portion of the apparatus shown in FIGURE 2a.

FIGURE 4 is an elevational view of the general assembly of an alternative form of that portion of the apparatus of the invention illustrated in FIGURE 1 as it would appear when suspended in a well borehole in readiness for operation.

FIGURES 5a and 5b are portions of a schematic diagram of the apparatus of the invention included in that shown in FIGURE 4.

FIGURE 6 is an enlarged graphical record produced by the indicating or recording portion of the apparatus shown in FIGURE 5a.

FIGURE 7 is an enlarged detail view of FIGURE 5b.

FIGURE 8 is a schematic diagram of an alternative arrangement of that portion of the apparatus shown in FIGURE 5a.

Figures 7, 8:
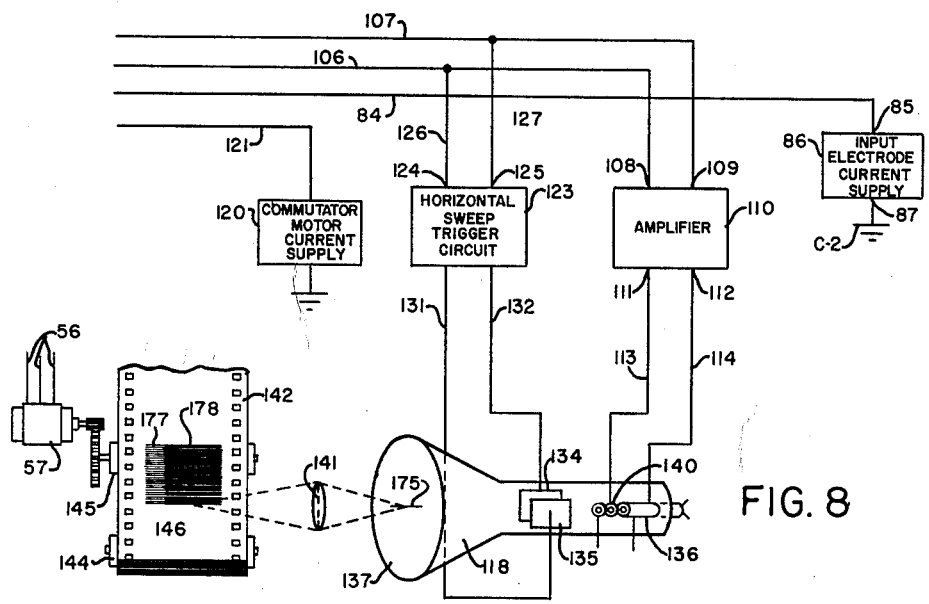

The apparatus is as follows:

Referring first primarily to FIGURE 1, 10 is an electrode assembly adapted to be lowered into a well borehole on a conductor cable 11. The cable 11 may be reeled in or payed out as required from a suitable hoist drum 12 located at the top of the well. The conductor cable 11 contains a plurality of insulated conductors which interconnect the electrode assembly 10 with the electrical apparatus at the top of the well as will be hereinafter more fully described.

The electrode assembly 10 comprises an elongated tubular body 13 having a cable socket 14 at the upper end thereof into which the conductor cable 11 is anchored and through which the insulated conductors pass from the cable end to the apparatus contained within the electrode body 13. At the lower end of the tubular body 13 is a tubular section 15 of enlarged diameter which carries at an intermediate portion thereof a cage spring assembly as shown at 16 which is composed of at least three outwardly bowed leaf springs, as shown at 17, adapted to press outward in sliding frictional engagement with the inside surface of the well borehole in a manner well known in the art, to effect a centering of the lower end of the electrode assembly within the well borehole. The lower extremity of section 15 is rounded or pointed, as shown at 19, to facilitate its passage through the borehole, and it carries adjacent the upper end thereof a pair of longitudinally spaced annular electrodes $P_1$ and $P_2$ hereinafter referred to as the potential pickup electrodes.

A sleeve member 23 having a cage assembly 24 fixed adjacent the upper end thereof and of a construction similar to that of the hereinbefore mentioned cage 16, is carried upon the tubular body member 13 and is free to slide longitudinally thereon between the shoulder 26 formed at the lower end of the cable head 14 and the shoulder 27 formed at the juncture of the tubular body portion 13 with the enlarged section 15 of the electrode assembly. An annular electrode member $C_1$, hereinafter referred to as the current input electrode, is carried on the sleeve member 23 adjacent its lower end 28.

The entire exterior surface of the electrode assembly 10, including the tubular member 13 and the sleeve member 23, but with the exception of the centering cage springs at 16 and 24, the cable head 14 and the outer cylindrical surfaces of the annular electrodes $P_1$, $P_2$ and $C_1$, is covered with a fluid tight layer of insulating material of rubber, neoprene or the like substance as is well known in the electrical logging art, to minimize any undesirable effects which the other electrically conductive portions of the electrode supporting structure might otherwise have upon the operation of the electrode system.

Reference is now directed primarily to FIGURES 2a and 2b, in which the electrical circuits and apparatus housed within the electrode assembly 10 and those provided at the earth surface at the top of the well, interconnected by means of the conductors within the conductor cable 11 are diagrammatically illustrated. The current input electrode $C_1$ is connected through a variable resistance 30 contained within the said electrode assembly 10 and through insulated conductor 31, within the conductor cable 11, and through surface conductor lead 32 to one terminal 33 of a suitable current supply 34, preferably an alternating current supply. The other terminal 35 of the current supply 34 is grounded at $C_2$ through conductor 36. If desired, the ground $C_2$ may be effected by connecting the conductor 36 to the metal sheath of the conductor cable 11 as is frequent and well known practice in the electrical logging art. The pickup electrodes $P_1$ and $P_2$ are connected through insulated conductors 38 and 39 contained within the conductor cable 11 and thence through surface conductors 40 and 41, respectively, to the terminals 42 and 43 of a suitable voltmeter or galvanometer device 45. The cable conductors 31, 38 and 39 make connection with slip rings rotatably mounted upon the conductor cable drum 12, and electrical connection is completed between these slip rings and the input terminal 33 of the current supply 34 and the beforementioned surface conductors 32, 40 and 41 through stationary brushes as illustrated respectively at 46, 47 and 48 as is conventional practice with such apparatus.

The voltmeter 45 includes a movable arm 49 having a pen or other suitable marking device at its outer end adapted to rest upon a movable chart or strip of graph paper 50 for the purpose of making a permanent graphical record as illustrated at 51 and which will be more fully described hereinafter in connection with the operation. The chart 50 is movable between a pair of rollers or reels 52 and 53 preferably at a rate which is proportional to the rate of motion of the cable 11 into or out of the well borehole. Such proportional motion may be accomplished by coupling an idler pulley over which the cable passes, as shown at 54, with the graph paper transporting mechanism through suitable means such as by a flexible shaft, belt or the like mechanical device similar to those disclosed in the patents to Jakosky Re. 21,797, or Elliott 2,222,608 or by electro-mechanical means as disclosed in Bowsky et al. 2,142,555 or as illustrated in FIGURES 1 and 2a hereof in which a Selsyn generator 25 is driven by the idler pulley 54 and this generator is in turn electrically coupled through suitable conductors as conventionally illustrated at 56 to a Selsyn motor 57 which in turn remotely drives the paper transporting roll 52 through suitable reduction gearing as shown at 58.

FIGURE 3 shows a view of the chart 50, sufficiently enlarged and positioned in such a manner as to illustrate the correlation of the graph 51 with the axis of the well borehole and the surrounding formation, as schematically illustrated in FIGURE 2b.

As beforementioned, the sleeve member 23 and the tubular body member 13 are longitudinally slidable a limited distance with respect to one another. The tubular body 13 of the electrode assembly 10 thus may be lowered through the sleeve member 23 from the position illustrated in FIGURE 1 while the sleeve is suspended within the borehole by the friction of cage 24 against the borehole wall, to increase the spacing between the input electrode $C_1$ and the pair of pickup electrodes $P_1$ and $P_2$ as diagrammatically indicated in FIGURE 2b. Thus the pickup electrodes $P_1$ and $P_2$ may be moved downward relative to the input electrode $C_1$ to their extreme lower positions illustrated at dotted lines $P_1''$ and $P_2''$ at which position the electrodes have their maximum longitudinal spacing or the pickup electrodes may be moved to any intermediate position such as that illustrated in dotted lines at $P_1'$ and $P_2'$.

Circular lines 59 and 60 drawn about the current input electrode $C_1$ as a center, illustrate the position of the spherical boundaries of the zone or spherical shell across which the potential measurement is taken when the potential pickup electrodes are located as shown at $P_1$ and $P_2$. The circular lines 61 and 62 drawn about the current input electrode $C_1$ as a center illustrate the spherical boundary surfaces of the zone or spherical shell across which the potential measurement is taken when the potential pickup electrodes are located in an intermediate position as indicated in dotted lines at $P_1'$ and $P_2'$. Similarly, circular lines 63 and 64 also drawn about the current input electrode $C_1$ as a center illustrate the position of the spherical boundary surfaces of the zone or spherical shell across which the potential measurement is taken when the potential pickup electrodes are located at their lowermost positions as illustrated in dotted lines at $P_1''$ and $P_2''$.

Referring now primarily to FIGURES 4, 5a, 5b, 6 and 7, in which an alternative or modified version of the apparatus of FIGURE 1 is illustrated, 70 is an electrode assembly as it would appear suspended in a well borehole 71 upon a conductor cable 18 which extends to a cable drum as illustrated at 73. The electrode assembly 70 includes an elongated, tubular body portion 75 having adjacent its upper and lower ends, cage spring assemblies as shown at 76 and 77. The cage assemblies 76 and 77 are of more or less conventional construction and each have at least three outwardly bowing springs as shown at 78 and 79 adapted to bear outwardly in resilient sliding engagement with the inside surface of the well borehole wall to maintain the electrode assembly 70 centered upon the axis of the borehole.

The tubular body portion 75 of the electrode assembly is covered from end to end with a fluid tight layer of insulating material in the same manner as hereinbefore mentioned in connection with the apparatus of FIGURE 1. A plurality of longitudinally spaced, annular shaped potential pickup electrodes as shown at $P_1$ to $P_{23}$, are carried by and suitably attached to the insulating covering of the tubular body portion 75 in such manner as to be insulated from one another and from the metal portions of the electrode assembly but exposed to electrical contact with surrounding borehole fluid. An annular shaped, current input electrode, as shown at $C_1$ is similarly positioned on the insulating covering on the tubular body member 75 adjacent the uppermost electrode $P_1$ of the potential pickup electrodes. All of the electrodes $C_1$ and $P_1$ to $P_{23}$ inclusive, are thus electrically insulated from each other and from the metal portions of the electrode assembly 70 but exposed to electrical contact with surrounding borehole fluid.

The apparatus contained within the electrode assembly 70 and that located at the surface of the ground outside of the well borehole and the electrical cable connections therebetween, are diagrammatically illustrated in FIGURES 5a, 5b and 7. The current input electrode $C_1$ is connected within the tubular body member 75 through connection 80 to the lower end of the cable conductor 81 and thence through stationary brush 82 at the cable drum 73 and through surface conductor 84 to one terminal 85 of the current supply 86. The other terminal of the current supply 86 is grounded as shown at $C_2$ through ground conductor 87. Each of the series of annular potential pickup electrodes $P_1$ to $P_{23}$ inclusive, are respectively connected within the tubular body portion 75 of the electrode assembly through the resistors shown at $R_1$ to $R_{23}$ and conductors 1 to 23, each to a separate segment of a commutator device 90. The commutator device 90 is provided, as here illustrated, with twenty-four commutator segments. Twenty-three of the commutator segments are connected to the twenty-three potential pickup electrodes leaving one computator segment, that shown at 91, electrically isolated and not connected to any conductor.

A pair of circumferentially spaced brushes 92 and 93 are adapted to be rotated in sliding contact with the commutator segments by means of a drive shaft 94 which is coupled to the shaft of a motor 95, all of which is housed within the tubular body 75 of the electrode assembly 70. A pair of slip rings 96 and 97 are coaxially mounted upon the shaft 94 and connected electrically with the beforementioned brushes 92 and 93, respectively. A pair of stationary brushes 98 and 99 make sliding electrical contact with the slip rings 96 and 97 and these brushes are, in turn, electrically connected through connections 100 and 101 to the bottom end of the cable conductors 102 and 103 within the tubular body 75, which are, in turn, connected at the top end of the conductor cable through brushes 104 and 105 at the cable drum 73 with surface conductors 106 and 107 which lead to input terminals 108 and 109 of amplifier 110. The output terminals 111 and 112 of the amplifier 110 are connected through conductors 113 and 114 to a pair of vertical deflection plates 115 and 116 of a cathode ray oscilloscope as illustrated at 118. The amplifier 110 may include in its output, suitable rectifier and filter circuits, not shown, but more fully described hereinafter.

Suitable current is supplied for operation of the motor 95 within the electrode assembly 70 from a current supply 120 exterior to the well borehole through the cable conductor 121 by way of hoist drum brush 122 and return through the ground connections.

The brushes 92 and 93 of the commutator device are circumferentially spaced a distance equal to the circumferential center to center spacing of adjacent commutator segments so that a pair of adjacent commutator segments are always connected across the cable conductors 102 and 103, and as the brushes of the commutator device are rotated, the adjacent pairs of commutator segments are connected to the conductors 100 and 101 in rapid succession.

A horizontal sweep trigger circuit of conventional design is provided for the cathode ray oscilloscope as indicated at 123. The control input terminals 124 and 125 of the horizontal sweep trigger circuit are connected respectively through conductors 126 and 127 to the beforementioned conductors 106 and 107. The output terminals 129 and 130 of the horizontal sweep trigger circuit are connected through conductors 131 and 132 to the horizontal deflection plates 133 and 134 respectively of the cathode ray oscilloscope 118.

The cathode ray oscilloscope 118 may be of conventional design having an electron gun portion as diagrammatically illustrated at 136 and a fluorescent screen at 137. The cathode current supply and cathode, anode and grid high voltage supply for the electron gun 136 may be of conventional design and therefore are omitted from the drawings.

A typical wave form is illustrated at 138 as it would appear on the fluorescent screen of the oscilloscope 118 under the operating conditions illustrated in FIGURES 5a and 5b as will be more fully explained hereinafter in connection with the operation.

FIGURE 6 shows the beforementioned wave form 138 sufficiently enlarged and positioned in such a manner as to illustrate the correlation of the curve with respect to the axis 140 of the well borehole and the surrounding formations as schematically illustrated in FIGURE 5b. A wave of similar form is also shown in FIGURE 9b which will be described hereinafter.

Referring now to FIGURE 8, a further modification of the recording portion of the apparatus adapted to be used in connection with the apparatus illustrated in FIGURES 5a and 5b is illustrated. The purpose of this apparatus is to make a continuous running record of the borehole diameter and depth of well fluid invasion, correlated with depth of the well borehole. In this latter case, the connections 131 and 132 leading from the horizontal sweep trigger circuit are connected to the horizontal deflection plates 134 and 135 of the oscilloscope 137 in the same manner as that hereinbefore described in connection with FIGURE 5a. However, the leads 113, 114 from the amplifier 110, instead of being connected to the vertical deflection plates 115 and 116, as shown in FIGURE 5a, are connected to the electron gun 136 of the oscilloscope, the connection 114 being connected to the cathode, and connection 113 being connected to the control grid at 140. In this latter arrangement, no vertical deflection plates need be used.

All of the other connections leading from the apparatus of FIGURE 5b to the commutator motor current supply 120, the horizontal sweep trigger circuit 123, amplifier 110 and input electrode current supply 86, are the same as those shown and hereinbefore described in connection with FIGURE 5a.

A suitable lens system is provided as shown at 141, adapted to focus any image formed upon the fluorescent screen 137 of the oscilloscope 118 upon a photographic strip of paper or film 142.

The photographic film or strip 142 is adapted to be transported longitudinally between rollers 144 and 145 by means of a suitable coupling of the same type and construction as that shown and hereinbefore described in connection with the apparatus of FIGURES 1 and 2a whereby the said longitudinal motion of the film or strip 142 is directly proportional to and correlated with the motion and depth of the electrode assembly 70 within the well borehole.

A variable density, photographic image of the fluorescent line 175 is formed at 146 on the strip 142, by means of the lens system 141 which, in conjunction with the motion of the strip 142, produces a variable density record as will be described more fully in connection with the operation.

The operation of the invention is as follows:

Referring first to FIGURE 1, the electrode assembly 10 is lowered into the well borehole by paying out conductor cable 11 from the conductor cable drum 12. When the electrode assembly 10 has reached a point in the well borehole where it is desired to make measurements, the lowering operation is temporarily halted. Following the aforesaid initial downward motion of the electrode system 10 within the well borehole, the conductor cable 11 may be hoisted a short distance sufficient to raise the tubular body portion 13 and the elements associated therewith including the pair of potential pickup electrodes $P_1$ and $P_2$, upward with respect to the sleeve member 23 during which movement the sleeve member 23 will be suspended stationary within the well borehole by the frictional engagement of the cage 24 with the borehole wall. The potential pickup electrodes $P_1$ and $P_2$ may then have assumed a position with respect to the current input electrode $C_1$ approximately that shown in FIGURE 1 and in solid lines in FIGURE 2b. At this position, while a current, preferably an alternating current, is applied to the penetrated formations between the ground $C_2$ and the current input electrode $C_1$ within the fluid in the well borehole, the potential picked up between the potential pickup electrodes $P_1$ and $P_2$ will be approximately that due to the effective resistivity of the volume of earth formation and well borehole fluid contained within the spherical shell bounded by the two concentric spherical surfaces represented in cross-section by the circular lines 59 and 60, in which the potential pickup electrodes $P_1$ and $P_2$ lie.

By lowering away on the conductor cable 11, the tubular body portion 13 of the electrode system may be lowered through the sleeve member 23 while the sleeve member 23 remains stationary within the well borehole supported by the cage 24. The potential pickup electrodes $P_1$ and $P_2$ may thus be moved relative to the current input electrode $C_1$ to any lower position desired within the beforementioned limits of such motion, two of such positions being illustrated in dotted lines at $P_1'$ and $P_2'$ and at $P_1''$ and $P_2''$. At these latter positions, as in the initially described position, the potential there picked up between the potential pickup electrodes, for example, in the position shown at $P_1'$ and $P_2'$, will be that corresponding to the resistivity of the volume of formation and well fluid contained within the spherical shell formed between the imaginary concentric spherical surfaces represented in cross-section by the circular lines at 61 and 62. In the lowermost position shown for the electrodes $P_1''$ and $P_2''$, the potential picked up between the potential pickup electrodes will be that corresponding to the resistivity of the volume of formation and the well fluid contained within the spherical shell formed between the concentric spherical surfaces represented in cross-section by the circular lines 63 and 64. As beforementioned, the minimum and maximum spacing between the pair of potential pickup electrodes $P_1$ and $P_2$ and the current input electrode $C_1$ is determined by the distance through which the tubular body portion 13 may be moved longitudinally within the sleeve member 23, the minimum spacing being determined by contact between the shoulder 27 of tubular section 15 and the lower end 28 of the tubular member 23, and the maximum spacing being determined by the contact between the shoulder 26 at the bottom end of the cable socket 14 with the upper end 22 of the said sleeve member 23. Greater latitude of motion may obviously be provided than that herein illustrated. As the pair of potential pickup electrodes $P_1$ and $P_2$ are moved downward from their most adjacent position with respect to the current input electrode $C_1$, the spherical shell across which the potential is being measured by the potential pickup electrodes $P_1$ and $P_2$ may be considered to expand continuously until it reaches a condition of maximum possible diameter approximating that illustrated by the curved lines 63 and 64 which occurs at the maximum downward displacement of the tubular body portion 13 with respect to the sleeve portion 23 of the electrode assembly 10.

In the condition where the spacing between the current input electrode $C_1$ and the potential pickup electrodes $P_1$ and $P_2$ is a minimum as when shoulders 27 and 28 are in contact with one another, the spherical shell across which the potential is being measured by the potential pickup electrodes $P_1$ and $P_2$ is represented by dotted lines at 20 and 21. In this position it is apparent that all of the volume of the spherical shell 20, 21 is located within the fluid within the borehole. As the spherical shell 20, 21 is caused to expand wholly within the well fluid by downward motion of the pair of pickup electrodes $P_1$ and $P_2$, with respect to the current input electrode $C_1$, the well fluid being of substantially homogenous resistivity, the potential picked up by the potential pickup electrodes $P_1$ and $P_2$ will remain substantially constant as graphically illustrated at 150 on the charts 50 of FIGURES 2a and 3. As the outer portion of the spherical shell 20, 21 passes into or intersects the wall of the well borehole from a position which it was wholly within the well fluid to a position in which a portion of it extends into the surrounding formation at point 65, the average resistivity of the material contained within the volume of the spherical zone undergoes an abrupt change which, in a case where the fluid-invaded formation at that point has a resultant resistivity substantially higher than the borehole fluid alone, results in a relatively sharp, upward bend of the curve as shown at 151 in FIGURES 2a and 3. As the imaginary spherical resistivity measurement shell continues to expand by further separation of the pair of pickup electrodes $P_1$ and $P_2$ downward from the current input electrode $C_1$, the inner spherical surface of the portion of the expanding shell radially opposite electrode $C_1$ finally passes outward beyond the adjacent borehole wall into the formation as shown at 59, 60 at which point the rate of change or rate of increase of average resistivity of the material within the volume of the spherical shell decreases, resulting in a leveling off or reduction in slope of the resistivity curve as shown at 152 in FIGURES 2a and 3. Thereafter as the spherical measurement shell continues to expand, the rate of change of resistivity within the spherical shell increases more slowly as the portion of the volume of the spherical shell contained wholly within the surrounding formations increases in proportion to those portions shown at 155 and 155' which remain contained within the well borehole fluid. This latter part of the curve is shown at 156 in FIGURES 2a and 3. When the outer spherical surface boundary of the spherical shell as shown at 61, 62 reaches the outer limit of the well-fluid invasion zone, as represented by the irregular boundary line 157, and begins to enter the uninvaded formation therebeyond which may be of higher resistivity by reason of the absence there of any conductive well fluid infiltrate, the average resistivity of said volume of formation contained within the spherical shell 61, 62 undergoes another abrupt change which in this case is a further increase in the rate of increase of resistivity as shown by the abrupt upward bend of the resistivity curve at 158, in FIGURES 2a and 3. This upward bend continues until the inner boundary of the spherical shell 61, 62 passes out into the formation beyond the interface 157 after which the curve again undergoes a gradual reduction in slope as illustrated in that part of the curve shown at 160.

By placing the chart, as shown in FIGURE 3, with the lefthand vertical zero axis on the center line or axis of the well borehole, it is then possible to determine by the shape of the curve that the radius of the well borehole is equal to the distance 0—R and that the distance of well fluid invasion into the formation is equal to 0—I. The maximum lateral depth of measurement as represented by the maximum diameter of the spherical shell 63, 64 is equal to the distance 0—D.

Figure 9:
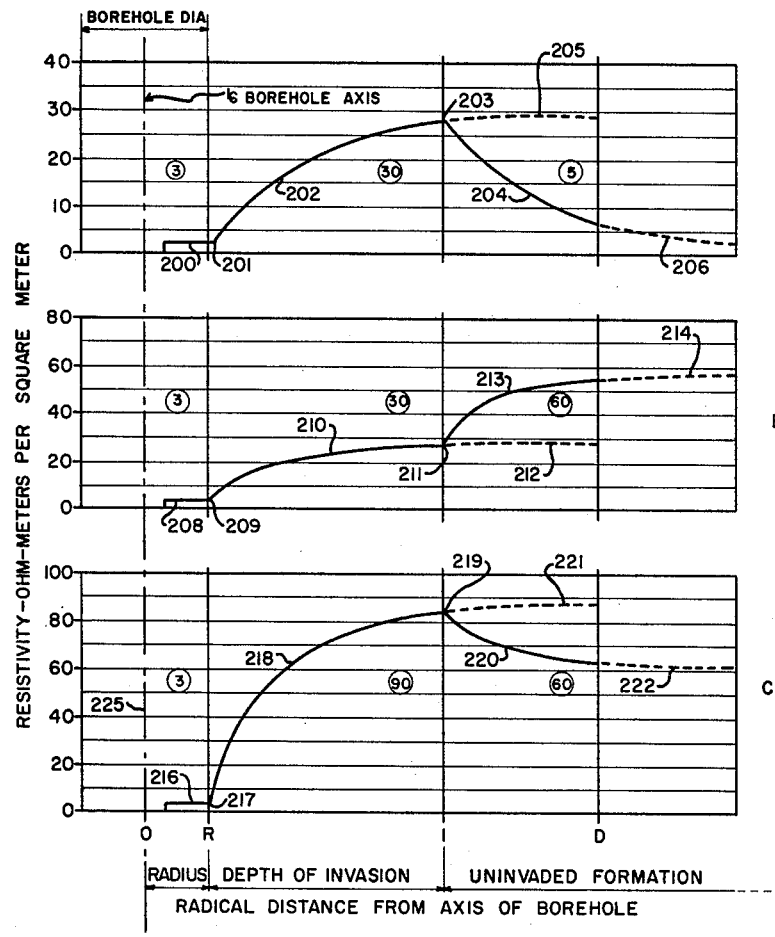
FIGURE 9 is a graphical illustration of typical forms of curves which may be indicated or produced by the apparatus of FIGURE 1 and FIGURE 4 under different conditions.

If the physical arrangement of the electrode system 10 permitted the distance between the pair of pickup electrodes $P_1$ and $P_2$ and the current input electrode $C_1$ to be continued to be increased without limit, the spherical shell 63, 64 would correspondingly expand without limit as a result of which the portion of the curve 160 would be projected laterally a corresponding further distance in the manner illustrated in dotted lines at 214 in FIGURE 9B along which it would approach asymptotically the resistivity value of the undisturbed formation extending laterally from the well borehole beyond the fluid invaded zone. By thus projecting the curve 160 in the manner illustrated in dotted lines at 214, an indication of the approximate resistivity of the undisturbed and uninvaded formation may be obtained, as more fully explained hereinafter in connection with FIGURE 9.

For the purpose of simplicity of illustration, the electrodes $C_1$, $P_1$ and $P_2$ have been illustrated as having relatively wide longitudinal spacing therebetween as compared to the borehole diameter. In actual construction where higher definition and greater accuracy in the determination of well borehole diameter and fluid invasion distance is required, the potential pickup electrodes $P_1$ and $P_2$ would be spaced closer together and the apparatus would be constructed such that the current input electrode $C_1$ and the pair of potential pickup electrodes $P_1$ and $P_2$ could be brought into closer proximity to one another than is indicated by the scale of the drawing, whereby the spherical shell illustrated in dotted lines at 20, 21 would be radially thinner and would have an initial diameter considerably smaller than that illustrated in FIGURE 1. With such closer electrode spacing arrangement, as the pickup electrodes are moved downward with respect to the current input electrode, the spherical shell would undergo a substantial expansion prior to moving of its external spherical boundary surface into contact with the inside surface of the well borehole. With such reduced thickness, of the spherical shell, the break in the curve at the point shown at 151 in FIGURE 3, would be more abrupt. The same would be true of the break in the curve shown at point 158. Thus, in the actual construction, greater definition in the curve shown in FIGURE 3 would be obtained.

During measurements as hereinbefore described, the potential pickup electrodes $P_1$ and $P_2$ may be moved up and down repeatedly with respect to the current input electrode $C_1$ by alternately hoisting and lowering the conductor cable 11 by means of the drum 12. Since the chart 50 is coupled to the drum 12 as hereinbefore described, it will move back and forth a proportional distance between the rollers 51 and 52 permitting the pen arm 49 of the meter 45 to retrace the curve repeatedly.

When it is desired to take measurements of the well borehole diameter and distance of fluid invasion at another point within the well borehole, the whole electrode assembly 10 may be raised or lowered to such point and the hereinbefore described process repeated.

The current electrode $C_1$ is preferably connected to the conductor cable 44 through a vraiable resistance 30 housed suitably within the tubular member 13 of the electrode assembly 10 and so coupled, one element thereof to the body 13 and another element thereof to the sleeve member 23, as to vary the resistance in accordance with a function of the separation of the pickup electrodes $P_1$ and $P_2$ from the current electrode $C_1$. In general, the resistance 30 should be so coupled and so constructed as to decrease in value as the electrode separation is increased, at such a rate as to compensate for the volume increase of the before-mentioned spherical shell accompanying such separation of the electrodes. The rate at which the resistance thus changes preferably should be such that if the electrode system were placed within a surrounding material which is homogenous with regard to its resistivity, separation of the potential pickup electrodes from the current input electrode in the manner hereinbefore described would result in a straight horizontal line on the chart of FIGURE 3 extending from R to D. Then, when the electrodes are immersed in a nonhomogenous surrounding material, such as the surrounding borehole fluid and adjacent formations illustrated in FIGURE 2b, the vertical deflections of the curve 156 of FIGURE 3 will represent changes in measured resistivity which are solely due to lateral variations and discontinuities in the electrical resistivity of those surrounding materials.

The rate of change of the resistance 30 to fulfill the before described condition can be expressed approximately as follows:

$$Ro = K\left(\frac{b-a}{ab}\right)$$

where $Ro$ is the sum of all the series resistances in the potential pickup circuit including the resistance 30, the resistances of the cable conductors 38 and 39, the surface conductors 40 and 41 and the input resistance of the meter 45, and where $a$ and $b$ are the distances of separation between the electrodes $C_1$ and $P_1$ and between $C_1$ and $P_2$, respectively. Resistance 30 should thus change in value and at a rate necessary to presume this relationship.

Referring now to the modified version of the apparatus of this invention as illustrated in FIGURES 4, 5a, 5b, 6 and 7, the operation is as follows:

The electrode system 70 is first lowered into the well borehole through the well fluid therein to a point opposite the formations to be logged. During the following logging operations, the motor 95 is set into operation by supplying it with current from the current supply 120. Continuous rotation is thereby imparted from the motor 95 through the shaft 94 to the commutator device including the brushes 92 and 93 and the slip rings 94 and 95. As the brushes 92 and 93 pass over the commutator segments, the two adjacent commutator segments over which the brushes 92 and 93 pass, are momentarily connected through the slip rings 94 and 95, brushes 96 and 97 to the conductors 100 and 101 and from there the circuit is completed through the cable conductors 102 and 103 and surface connecting wire 106 and 107 to the input terminals 108 and 109 of the amplifier 110. For example, at the particular instant of operation illustrated in FIGURE 5b, the brushes 92 and 93 rest upon and make electrical contact with the commutator segments to which conductors 314 and 315 lead. These conductors 314 and 315 each make connection through resistors $R_{14}$ and $R_{15}$ to the potential pickup electrodes $P_{14}$ and $P_{15}$, respectively. Therefore, at this instant the potential being picked up by the potential pickup electrodes $P_{14}$ and $P_{15}$ is that appearing across the spherical shell between the spherical surfaces 170 and 171. The potential thus picked up from eletcrodes $P_{14}$ and $P_{15}$ are applied, as before described, to the amplifier 110. The resultant amplified current output from amplifier 110 is applied through conductors 113 and 114 to the vertical deflection plates 115 and 116 of the oscilloscope 118, with the resultant deflection of the electron beam within the oscilloscope to impinge upon the fluorescent screen 137 at the point 172 at the particular instant of operation illustrated. Assuming the commutator device is rotating in a clockwise direction as indicated by the arrow, the brushes 92 and 93 will next be moved into contact with the commutator segments to which conductors 315 and 316, resistors $R_{15}$ and $R_{16}$, and potential pickup electrodes $P_{15}$ and $P_{16}$ are attached. The potential picked up between the potential pickup electrodes $P_{15}$ and $P_{16}$ will next be applied to the circuit leading to amplifier 110. Thus, each adjacent pair of commutator segments and the corresponding potential pickup electrodes will be connected in rapid succession to the measuring circuit leading to the amplifier 110, the output from which is applied to the vertical deflection plates 115 and 116 of the oscilloscope 118. Therefore, for each rotation of the commutator device the potential picked up between each pair of pickup potential electrodes from electrode $P_1$ to electrode $P_{23}$, is measured in rapid succession causing, in effect, the earth formation adjacent the electrode assembly within the well borehole to be, in effect, scanned laterally by a stepwise expanding, spherical shell of potential-difference measurement which expands from its minimum diameter, as illustrated at 169, 170 to its maximum diameter illustrated at 172, 173, once for each rotation of the commutator device.

It is to be noted that twenty-four commutator segments are shown in the commutator device. Twenty-three of these commutator segments are connected to the potential pickup electrodes $P_1$ to $P_{23}$. The twenty-fourth commutator segment which is indicated at 91 is electrically isolated, without any connection thereto. As the brushes 92, 93 pass over commutator segment 91 there is a momentary open circuit in the circuit leading to the amplifier 110 and also to the horizontal sweep trigger circuit 123. This open circuit interval is utilized by suitable means well known in the art to actuate the horizontal sweep trigger circuit to produce a saw toothed pulse for each revolution of the commutator device. The potential thus generated by the horizontal sweep trigger circuit 123 thus triggered in synchronism with the rotation of the commutator device, is impressed upon the horizontal deflection plates 133 and 134 of the oscilloscope 118 to produce one full scale sweep of the electron beam horizontally across the oscilloscope screen for each revolution of the commutator device. A curve or wave form is thus formed on the fluorescent material 137 of the oscilloscope of the type illustrated at 138, the vertical deflection of which is proportional to a function of or representative of the resistivity measurements between the successively connected pairs of potential pickup electrodes and the horizontal deflection of which is preferably proportional to or capable of calibration in terms of the lateral distance of the successive spherical shells of potential measurement from the axis of the well borehole.

When alternating current is supplied by the current supply 86 and utilized in the electrical logging operations, the amplifier 110 preferably includes suitable rectification and filtering means to produce an output at 111 and 112 which when impressed upon the deflection plates 115 and 116 of the oscilloscope will result in a relatively smooth, continuous curve instead of individual pulses for each commutator connection.

FIGURE 6 and FIGURE 9B illustrate the curve 138 as produced on the fluorescent screen of the oscilloscope, enlarged sufficiently in each case to be correlated in scale with the axis of the well borehole and the adjacent formation. As hereinbefore described in connection with FIGURES 1, 2a, and 2b and 3, the breaks in slope appearing in the curve 138 at 176 and 172 are indicative of the positions of the well borehole wall and the lateral limit of well fluid invasion into the adjacent formation. Thus it is apparent that at a distance R from the well borehole axis, as shown in FIGURES 5a and 6, the spherical shell of resistivity measurement first contacts the inside surface of the well borehole. Similarly, at a distance I from the axis of the well borehole, the upward break in the curve, appearing at 172, indicates the lateral distance of invasion of well borehole fluid filtrate into the formation.

As hereinbefore described in connection with FIGURE 1 to FIGURE 3, the plurality of electrodes including the current input electrode $C_1$, and the potential pickup electrodes $P_1$ to $P_{23}$, have for convenience been illustrated as being relatively widely separated and relatively few in number. Actually, in the practical construction of the apparatus, a larger number of potential pickup electrodes more closely spaced are employed. For example, in order to measure with greater definition and accuracy the well borehole diameter and the depth of well fluid invasion of a depth of, for example, three feet laterally from the axis of the well borehole 144 potential pickup electrodes longitudinally spaced approximately ¼ inch from center to center may be employed and the minimum spacing between the current input electrode $C_1$ and the first adjacent potential pickup electrode $P_1$ may be in the order of ½ of an inch. Each electrode should be relatively thin in order to avoid the establishment of any substantial, longitudinal, short-circuiting current path therethrough from electrode to electrode; for example, an electrode thickness of approximately 1/16 of an inch in thickness has been found to be satisfactory and the outside diameter of the exposed surface of these electrodes may be in the order of three inches.

The resistances $R_1$ and $R_{23}$, inclusive, may be graduated in value in accordance with the relationship hereinbefore mentioned in connection with the apparatus of FIGURES 1 and 2b to compensate for the different diameters of the spherical potential measurement shells measured by the pairs of potential pickup electrodes. For example, the total resistance, $Ro$ present in the measuring circuit connected through the commutator brushes 92 and 93 including the resistances $R_{14}$ and $R_{15}$ may be expressed as:

$$Ro = K\left(\frac{b-a}{ab}\right)$$

where $a$ equals the distance from electrode $C_1$ to electrode $P_{14}$, and where $b$ equals the distance from electrode $C_1$ to electrode $P_{15}$, and K is a suitable constant depending upon the current input, average resistivity of the formations to be measured and the full scale range of the type of potential measuring device at the well surface such as the oscilloscope 118 and amplifier 110.

It may, under some conditions, be desirable to introduce compensation for the varying electrode spacing by other means, particularly where the potential picked up by the pickup electrodes is introduced into an extremely high impedance input, voltage measuring circuit such as may be present in a vacuum tube voltmeter circuit such as that which may comprise amplifier 110. In such latter case, a suitable electrical control current or pulse may be communicated from the commutator motor current supply 120 through conductor 178 to the amplifier 110 and return through suitable ground connections to effect a periodic variation in the gain of the amplifier. Proper synchronism is assured, for example, by employing an alternating current generator for the current supply 120 and a synchronous motor at 95 for driving the commutator. A synchronously driven gain control may be employed in the amplifier 110, driven by a portion of the alternating current from the said current supply 120, by means of which the required variations in gain will be synchronized with the commutator device 90.

Referring now to FIGURE 8, the rapidly, stepwise varying potential differences obtained from the plurality of potential pickup electrodes instead of being applied to the vertical deflection plates of an oscillograph after amplification as shown in FIGURE 5a, are here applied between the cathode and control grid of the oscilloscope 118. Thus, the amplified, picked-up potentials are applied from the amplifier 110 through conductors 113 and 114 to the control grid 140 and to the cathode 136, respectively, of the oscilloscope 118. The quantity of electrons in the electron beam impinging upon the fluorescent screen 137 is thus varied or modulated in accordance with the different or varying potentials picked up by the potential pickup electrodes $P_1$ to $P_{23}$, respectively. The electron beam is deflected horizontally in the same manner as hereinbefore described in connection with FIGURE 5a by means of the sweep potential pulses obtained from trigger circuit 123 and applied to the horizontal deflection plate 134 and 135 through conductors 131 and 132, respectively. In this manner, for each complete cycle of potential measurements from potential pickup electrodes $P_1$ to $P_{23}$ occurring during each rotation of the commutator device, the electron beam is deflected horizontally to form a horizontal fluorescent line, as shown at 175 on the fluorescent screen 137. The intensity or brilliance of the fluorescence of line 175 is governed by the potential applied to the control grid 140 as hereinbefore mentioned. The image of the fluorescent line 175 is projected by means of a suitable lens 141 onto a light sensitive strip of material such as a photographic film 142 which is moved longitudinally across the rollers 144 and 145 a distance proportional to the motion of the electrode assembly 70 within the well borehole. A variable density recording is thus produced on the photographic strip 142 having the appearance as illustrated at 146 with variations in density appearing where the curves illustrated in FIGURE 3 and FIGURE 6, exhibited breaks in slope. By inspection of the variable density record thus made, it is possible to determine that the borehole diameter corresponds to the horizontal position of the first visible abrupt change in density as illustrated at 177 and that the outer limit of well fluid invasion is at a distance from the borehole axis as indicated by the horizontal position of the next visible abrupt change in density as illustrated at 178. By correlation between the electrode spacing of the electrode assembly 70 within the well borehole and the magnitude and rate of the horizontal sweep of the electron beam in the oscilloscope 118 as manifested by the horizontal length of the variable density line upon the photographic strip 142, the actual dimensions of the well borehole and distance of lateral invasion of well borehole fluid may be approximately established.

By the method and apparatus illustrated in connection with FIGURE 8, a continuous graphical record may be made of well borehole diameter and depth of fluid invasion, correlated with well borehole depth.

The resistivity curves shown in FIGURES 3 and 6 are of the general character which result where the well borehole fluid has a relatively low resistivity, for example, three ohms per square meter per meter, the uninvaded formation a relatively high resistivity, for example, sixty ohms per square meter per meter, and where the intermediate, invaded portion of the formation has an intermediate resistivity, for example, thirty ohms per square meter per meter. The relative resistivities of these explored zones varies considerably from formation to formation resulting in measured curves of different form and character but wherever a lateral discontinuity in resistivity is present, the curve will indicate it by an abrupt change in slope.

Referring now to FIGURE 9, the curves A, B and C are representative of the type of curves obtainable by the process and apparatus of FIGURES 1 to 6, inclusive, under different conditions. For curve A, the well borehole fluid, the surrounding invaded formation and the formation beyond the zone of invasion are assumed to have resistivities of 3, 30 and 3 ohm-meters per square meter, respectively. Under these conditions, as the pickup electrodes are moved from their initial position close to the input electrode outward to their maximum spacing, the initial horizontal portion of the curve shown at 200 is indicative of the resistivity of the well borehole fluid. The upward break or abrupt increase in slope of the curve shown at 201 is indicative of the electrode spacing at which the spherical potential measurement shell begins to enter the adjacent well borehole wall. The following portion of the curve shown at 202 of gradually reducing slope is representative of that portion of the resistivity measurement between the expanding spherical potential measurement shell which includes a portion of the well borehole fluid and the surrounding fluid invaded formation. The abrupt reversal of slope of the curve shown at 203 is indicative of the electrode spacing and the corresponding lateral depth of the resistivity measurement shell as it begins to pass from the invaded formation zone into the surrounding uninvaded formation as illustrated by the position of the circles 61 and 62 or circles 170 and 171 in FIGURES 2b and 5b, respectively. The balance of the curve illustrated at 204 has a downward slope reverse to that shown at 202 by reason of the fact that the surrounding uninvaded formation has a relatively low resistivity as compared to that of the invaded zone. From curve A, it may be concluded that the formation surrounding the well borehole is probably a dense formation of low porosity containing a connate fluid of low resistivity such as salt water. Some such condition must exist, otherwise the invaded formation would not display a resistivity which is so high relative to the resistivities of the mud and of the uninvaded formation lying beyond the zone of invasion.

Now if the portion of the curve shown at 202 is projected forward on the same trend and as illustrated by the dotted lines shown at 205, it is apparent that the curve is approximately asymptotic to the 30 ohm ordinate of the graph. From this it may reasonably be concluded that if the lateral penetration of the resistivity measurement is extended to such an extent that substantially the entire area or volume of the resistivity measurement shell lies within a surrounding fluid invaded formation of unlimited extent, the curve would approach an ordinate value of 30 ohms as a limit. Thus, it appears that the invaded formation zone has a resistivity of approximately 30 ohm-meters per square meter as beforestated.

Similarly, if the portion of the curve shown at 204 is projected forward as illustrated by the dotted lines at 206, it apparently approaches asymptotically a resistivity value of 3 ohm-meters per square meter as a minimum limit. From this it may be concluded that the true resistivity of the uninvaded formation lying beyond the zone of invasion is approximately 3 ohm-meters per square meter as beforestated.

Referring now to the curve B, as in the previous curve, the horizontal portion shown at 208 represents the resistivity of the well borehole fluid. The abrupt change in slope of the curve shown at 209 represents the lateral distance at which the resistivity measurement spherical shell enters the surrounding borehole wall. The following upwardly sloping curve shown at 210 represents the effect upon the measured resistivity of the resistivity measurement shell as more and more of its volume enters the surrounding zone of invasion of the formation. The abrupt upward increase in slope shown at 211 is indicative of the lateral distance at which the spherical potential measurement shell commences to leave the invaded zone and enters the outlying uninvaded portions of the surrounding formation.

As in the case of curve A if the portion of the curve shown at 210 of B is projected forward, as illustrated in dotted lines at 212, it apparently approaches the 30 ohm ordinate of the graph asymptotically as a limit. From this it may be reasonably concluded that the true resistivity of the fluid invaded zone is approximately 30 ohm-meters per square meter.

The following portion of the curve shown at 213 is representative of the effect of the entrance of the spherical potential measurement shell into the surrounding uninvaded formation. If this curve is projected forward as shown in dotted lines at 214, the resultant curve apparently approaches asymptotically the 60 ohm ordinate of the graph as a limit. From this it may be reasonably concluded that the true resistivity of the surrounding uninvaded formation is approximately 60 ohm-meters per square meter.

In curve C the initial horizontal portion shown at 216 represents the resistivity of the well borehole fluid. The abrupt upward increase in slope of the curve shown at 217 is indicative of the point at which the spherical resistivity measurement shell enters the surrounding borehole wall. The following upwardly sloping curve shown at 218 represents the increase in measured resistivity as the spherical potential measurement shell enters the surrounding fluid invaded zone. The abrupt reversal and downward slope of the curve shown at 219 indicates the lateral point at which the resistivity measurement spherical shell passes out of the invaded formation into the surrounding uninvaded formation. The downwardly sloping part of the curve shown at 220 indicated the gradual reduction in measured resistivity resulting from more and more of the spherical potential measurement shell entering the surrounding, uninvaded formation.

If, as hereinbefore described, that portion of the curve shown at 218 is projected forward sufficiently far, as illustrated in dotted lines at 211, it is apparent that it approaches the 90 ohm ordinate of the graph asymptotically as a limit. From this it may be reasonably concluded that the true resistivity of the invaded zone of the formation is approximately 90 ohm meters per square meter. Likewise, if the latter portion of the curve shown at 220 is projected forward sufficiently far as illustrated in dotted lines at 222, it apparently approaches the 60 ohm ordinate of the graph asymptotically as a limit. Likewise, from this it may be reasonably concluded that the true resistivity of the surrounding uninvaded formation is 60 ohm meters per squire meter as beforestated.

In the before described curves of FIGURE 9, the dash-dot line at 225 indicates the position of the center line or longitudinal axis of the well borehole, relative to the abscissa of these curves. The distance 0—R with proper correlation of scale is indicative of the well borehole radius. The distance 0—I is similarly indicative of the depth of invasion of the well borehole fluid into the surrounding formation. The distance 0—D is similarly indicative of the maximum possible separation of the measuring electrodes in the well borehole and is thus the maximum lateral depth to which resistivity measurements can be made by the particular apparatus illustrated. The distance 0—D and the corresponding lateral depth of possible resistivity measurements may obviously be modified and increased to any desired value within the practical limits of suitable design of the borehole electrode assembly and associated apparatus.

From the foregoing it is believed obvious that a particular advantage and point of novelty of this invention resides in the discovery that by recording the apparent resistivities of the borehole fluid and formation surrounding the borehole continuously from a point close to the axis of the well borehole to a laterally remote point in the surrounding formations, information may be obtained which is indicative of the locations of lateral discontinuities in the electrical resistivities of the surrounding materials, whereby the well borehole diameter and the depth of fluid invasion may be determined readily and with substantially greater accuracy than was ever possible heretofore. Furthermore, by this information, it is possible to determine with reasonable accuracy the true resistivity of the surrounding invaded formation and uninvaded formation, which insofar as the inventor is aware has never been heretofore possible.

In the apparatus illustrated in FIGURES 4 to 5b, inclusive, when employing 144 pickup electrodes as beforementioned, it has been found that suitable speeds of operation of the commutator device may be between approximately $\frac{1}{16}$ to 1 revolution per second. It is desirable that in case of operation of the electrologging system with an alternating current of say 144 cycles per second, that at least one cycle and preferably two cycles, pass through the circuit during contact of the commutator device with any one of the commutator segments. At this frequency, the commutator is operated at either 30 or 60 revolutions per minute. In a case where, for example, a square wave alternating current of 15 cycles per second is employed, as disclosed in co-pending application Serial No. 17,478, the commutator device may be operated at a speed of 6¼ revolutions per minute in order to permit at least one full cycle to pass through the measuring circuits during contact of the brushes of the commutator device with any one of the commutator segments.

It is to be understood that the foregoing is illustrative only and that the invention is not limited thereby but may include various modifications and changes made by those skilled in the art without distinguishing from the spirit and scope of the invention as defined in the appended claims.

What is claimed is:

1. A method of maikng lateral measurements within a well borehole comprising: positioning an input electrodes within and substantially centered upon the longitudinal axis of the well borehole and in electrical contact with conductive well fluid therein; establishing a ground connection remote from said input electrode; flowing an electric current through the earth formations surrounding said borehole between said input electrode and said ground connection to establish thereby potential gradient extending substantially radially in all directions from said input electrode as a center; locating at least three potential pickup electrodes in said well borehole, in the vicinity of said input electrode in electrical contact with conductive well fluid therein, said pickup electrodes being substantially axially centered and spaced apart axially with respect to one another and with respect to said input electrode; successively measuring the resultant potential differences picked up between different, equally spaced pairs of said pickup electrodes in correlation with a function of the axial spacing of said pairs of pickup electrodes from said input electrode; and correlating the thus measured potential differences with the depth in said well borehole at which such electrodes are positioned.

2. A method of making lateral measurements within a well borehole comprising: positioning an input electrode within and substantially centered upon the longitudinal axis of the well borehole; establishing a ground connection remote from said input electrode; flowing an electric current through the earth formations surrounding said borehole between said input electrode and said ground connection to establish thereby a potential gradient extending substantially radially in all directions from said input electrode as a center; locating at least three potential pickup electrodes in said well borehole, in the vicinity of said input electrode, said pickup electrodes being substantially axially centered and spaced apart axially with respect to one another and with respect to said input electrode; and successively and repeatedly measuring the potential differences resulting from said potential gradient, between different, equally spaced pairs of said pickup electrodes in correlation with a function of the axial spacing of said pairs of pickup electrodes from said input electrode.

3. Apparatus for making lateral measurements within a well borehole comprising: an elongated body member adapted to be lowered axially into a fluid-containing well borehole by means of a conductor cable; an insulating exterior on a major portion of said body member; an input electrode on said body member and adapted to make electrical contact with conductive fluid in such borehole; at least three pickup electrodes carried on said body member and spaced apart axially with respect to one another and with respect to said input electrode, the exterior surface of said body member extending between said electrodes being thereby composed of insulating material whereby substantially only said electrodes are exposed for electrical contact with such fluid; a measuring circuit including insulating conductors in said conductor cable; switching means to connect to said measuring circuit to different, equally spaced pairs of said pickup electrodes in repeated succession; and means included in said measuring circuit to indicate the value of the potential differences thus impressed upon said measuring circuit from said pair of pickup electrodes in relation to the corresponding axial spacings of said pairs of pickup electrodes from said input electrode.

4. Apparatus for making lateral measurements within a well borehole comprising: an elongated body member adapted to be lowered axially into a fluid-containing well borehole by means of a conductor cable; an insulating exterior on a major portion of said body member; an input electrode on said body member and adapted to make electrical contact with conductive fluid in such borehole; at least three pickup electrodes carred on said body member and spaced apart axially with respect to one another and with respect to said electrode, the exterior surface of said body member extending between said electrodes being thereby composed of insulating material whereby substantially only said electrodes are exposed for electrical contact with such fluid; a measuring circuit including insulated conductors in said conductor cable; switching means to connect to said measuring circuit to different, equally spaced pairs of said pickup electrodes in repeated succession; means to modify the potentials thus impressed upon said measuring circuit from said pairs of pickup electrodes substantially to eliminate differences thereof between the plurality of pairs of pickup electrodes which are solely due to the effect of the axial distances of said pairs of pickup electrodes from said input electrode; and means included in said measuring circuit to indicate the values of the thus modified potential differences thus impressed upon said measuring circuit from said pairs of pickup electrodes in relation to the corresponding axial spacings of said pairs of pickup electrodes from said input electrode.

5. Apparatus according to claim 4 in which said switching means and said means to modify the potentials impressed upon said measuring circuit are contained with the said body member.

6. Apparatus according to claim 5 in which said modifying means comprises resistances of different values connected in series between each pair of said pickup electrodes and said switching means.

7. A method of investigating earth formations traversed by a borehole while the hole is substantially filled with drilling fluid, the filtrate from which having penetrated the formations to varying radial extents depending, in part, upon the physical properties of the formations and their normal fluid content, said method comprising obtaining at least one individual indication that is primarily a function of the resistivity of said formations and the fluids contained therein in each of a plurality of regions of said formations bounded by a pair of surfaces at different radial distances from the bore hole, said regions being radially displaced from each other and displaced outwardly from the wall of said bore hole, said regions including a first region containing said filtrate which has invaded said formations and a second region including a portion of said formations uninvaded by said filtrate.

8. A method of investigating earth formations traversed by a bore hole while the hole is substantially filled with drilling fluid, the filtrate from which having penetrated the formations to varying radial extents depending, in part, upon the physical properties of the formations and their normal fluid content, said method comprising obtaining at least one individual indication that is primarily a function of the resistivity of said formations and the fluids contained therein in each of a plurality of regions of said formations bounded by a pair of surfaces at different radial distances from the bore hole, said regions being radially displaced from each other and displaced outwardly from the wall of said bore hole, said regions including a first region invaded by said filtrate which has entered said formations, a second region uninvaded by said filtrate and a plurality of other of said regions filling all of the space between said first and second regions.

9. A method of investigating earth formations traversed by a bore hole while the hole is substantially filled with drilling fluid, the filtrate from which having penetrated the formations to varying radial extents depending, in part, upon the physical properties of the formations and their natural fluid content, said method comprising obtaining at least one indication that is primarily dependent upon the resistivity of that portion of the formation near the bore hole which is substantially saturated with said filtrate, obtaining at least one indication that is primarily dependent upon the resistivity of the undisturbed portion of the formation beyond the zone of filtrate invasion thus containing essentially only naturally-occurring formation fluids in their undisturbed state, and obtaining at least one indication which is primarily dependent upon the resistivity of the formation which is intermediate between said filtrate-saturated portion and said undisturbed portion and hence containing a mixture of said filtrate and said naturally-occurring formation fluids.

10. A method of investigating earth formations traversed by a bore hole while the hole is substantially filled with drilling fluid, the filtrate from which having penetrated the formations to varying radial extents depending, in part, upon the physical properties of the formations and their natural fluid content, obtaining a plurality of measurements each of which is primarily a function of the resistivity of the formation included in the region between two surfaces at different radial distances from the bore hole, these regions of investigation ranging from very near the bore hole to include the zone of the formation containing principally the aforementioned filtrate and ranging outward to include at least a portion of the undisturbed zone of the formation.

References Cited in the file of this patent

UNITED STATES PATENTS 2,415,364    Mounce ------------------ Feb. 4, 1947